(12) United States Patent
Yasuo (10) Patent No.: US 9,395,501 B2
(45) Date of Patent: Jul. 19, 2016

(54) CONNECTION DEVICE, COMPUTER SYSTEM, AND CONNECTION METHOD OF COMPUTER SYSTEM

(71) Applicant: FUJITSU LIMITED, Kawasaki-shi, Kanagawa (JP)

(72) Inventor: Akihiro Yasuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/595,571

(22) Filed: Jan. 13, 2015

(65) Prior Publication Data

US 2015/0277050 A1 Oct. 1, 2015

(30) Foreign Application Priority Data

Mar. 28, 2014 (JP) ................................ 2014-068610

(51) Int. Cl.
*G02B 6/36* (2006.01)
*G02B 6/38* (2006.01)
*G02B 6/26* (2006.01)

(52) U.S. Cl.
CPC ................ *G02B 6/3895* (2013.01); *G02B 6/26* (2013.01); *G02B 6/38* (2013.01)

(58) Field of Classification Search
None
See application file for complete search history.

(56) References Cited

U.S. PATENT DOCUMENTS

| 5,885,100 | A * | 3/1999 | Talend et al. | G02B 6/4292 439/490 |
| 6,375,362 | B1 * | 4/2002 | Heiles et al. | G02B 6/3827 385/135 |
| 7,137,743 | B2 * | 11/2006 | Graham et al. | H01R 13/7172 385/114 |
| 7,194,183 | B2 * | 3/2007 | Thornton et al. | G02B 6/0001 385/139 |
| 8,368,533 | B1 * | 2/2013 | Kelly | G02B 6/4471 340/10.1 |
| 2006/0120671 | A1 * | 6/2006 | Graham et al. | G02B 6/3817 385/75 |
| 2008/0205819 | A1 * | 8/2008 | Johnson et al. | H04J 14/0204 385/17 |
| 2011/0034068 | A1 * | 2/2011 | Russell | G02B 6/3895 439/488 |
| 2013/0301036 | A1 * | 11/2013 | Schillab et al. | G01M 11/3154 356/73.1 |

FOREIGN PATENT DOCUMENTS

| JP | 05-180728 | 7/1993 |
| JP | 3166071 | 2/2011 |

* cited by examiner

*Primary Examiner* — Mike Stahl
(74) *Attorney, Agent, or Firm* — Staas & Halsey LLP (57) ABSTRACT

A connection device, capable of visually confirming the connection between a connector pair, including: an optical connector pair that includes a first optical connector and a second optical connector each of which includes a plurality of terminals and corresponding terminals of which are connected to each other by light; a guide light member that guides light to a terminal of one of the first optical connector and the second optical connector; and a visual recognition member that is used to visually recognize the light that passes through from the terminal of the selected optical connector to a terminal of the opposite optical connector.

8 Claims, 12 Drawing Sheets

CONNECTION DEVICE, COMPUTER SYSTEM, AND CONNECTION METHOD OF COMPUTER SYSTEM

CROSS-REFERENCE TO RELATED APPLICATION

This application is based upon and claims the benefit of priority of the prior Japanese Patent Application No. 2014-068610, filed on Mar. 28, 2014, the entire contents of which are incorporated herein by reference.

FIELD

The embodiments discussed herein are related to a connection device, a computer system, and a connection method of the computer system.

BACKGROUND

There is a device in which a light source having different hues or emission patterns that respectively correspond to a plurality of optical fibers is provided on the back surface of an insertion port into which a connector at one end of an optical fiber is inserted, and the connection is checked by observing the light state from a connector at the other end of the optical cable.

In addition, there is a method in which a light emitter that emits visible light is caused to face the cross-section at one end of an optical fiber cable that includes one or more optical fiber core wires from among the cross-sections of both ends of the optical fiber cable, and the visible light is caused to pass through the whole optical fiber core wires to check the presence or absence of an optical fiber core wire that does not emit light by visual check of the cross-section of the other end of the optical fiber cable.

Japanese Registered Utility Model No. 3166071, and Japanese Laid-open Patent Publication No. 5-180728 are the related arts.

There is a case in which it is difficult to check the connection state between optical connectors that are connected to each other through light.

An object of the technology discussed herein is to easily check the connection state between optical connectors.

SUMMARY

According to an aspect of the invention, a connection device, capable of visually confirming the connection between a connector pair, is disclosed, which includes: an optical connector pair that includes a first optical connector and a second optical connector each of which includes a plurality of terminals and corresponding terminals of which are connected to each other by light; a guide light member that guides light to a terminal of one of the first optical connector and the second optical connector; and a visual recognition member that is used to visually recognize the light that passes through from the terminal of the selected optical connector to a terminal of the opposite optical connector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A first embodiment is described below in detail with reference to drawings.

Figure 1:
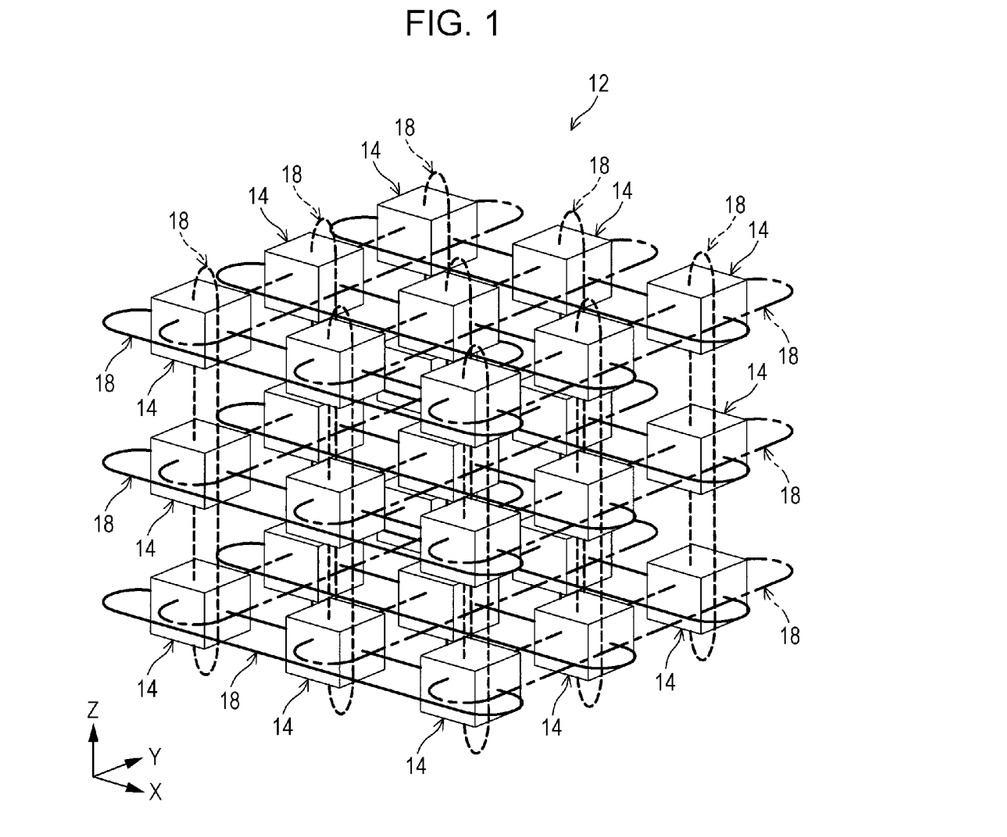
FIG. 1 is a perspective view illustrating a computer system according to a first embodiment.

In FIG. 1, a parallel computer system (hereinafter, simply referred to as computer system) 12 according to the first embodiment is illustrated. The computer system 12 includes a plurality of computer units 14. In the example illustrated in FIG. 1, the plurality of computer units 14 are arranged in a three dimension, that is, in the X direction, the Y direction, and the Z direction that are orthogonal to each other. In addition, the plurality of computer units 14 is connected to each other in a loop through an optical cable 18 in the respective X direction, Y direction, and Z direction. As a result, in the entire computer system 12, the computer units 14 are directly connected to each other through the optical cable 18, or connected to each other through the optical cable 18 and a further computer unit 14. The number of the computer units 14 that are arranged in the X direction, the Y direction, and the Z direction is not particularly limited.

Figure 2:
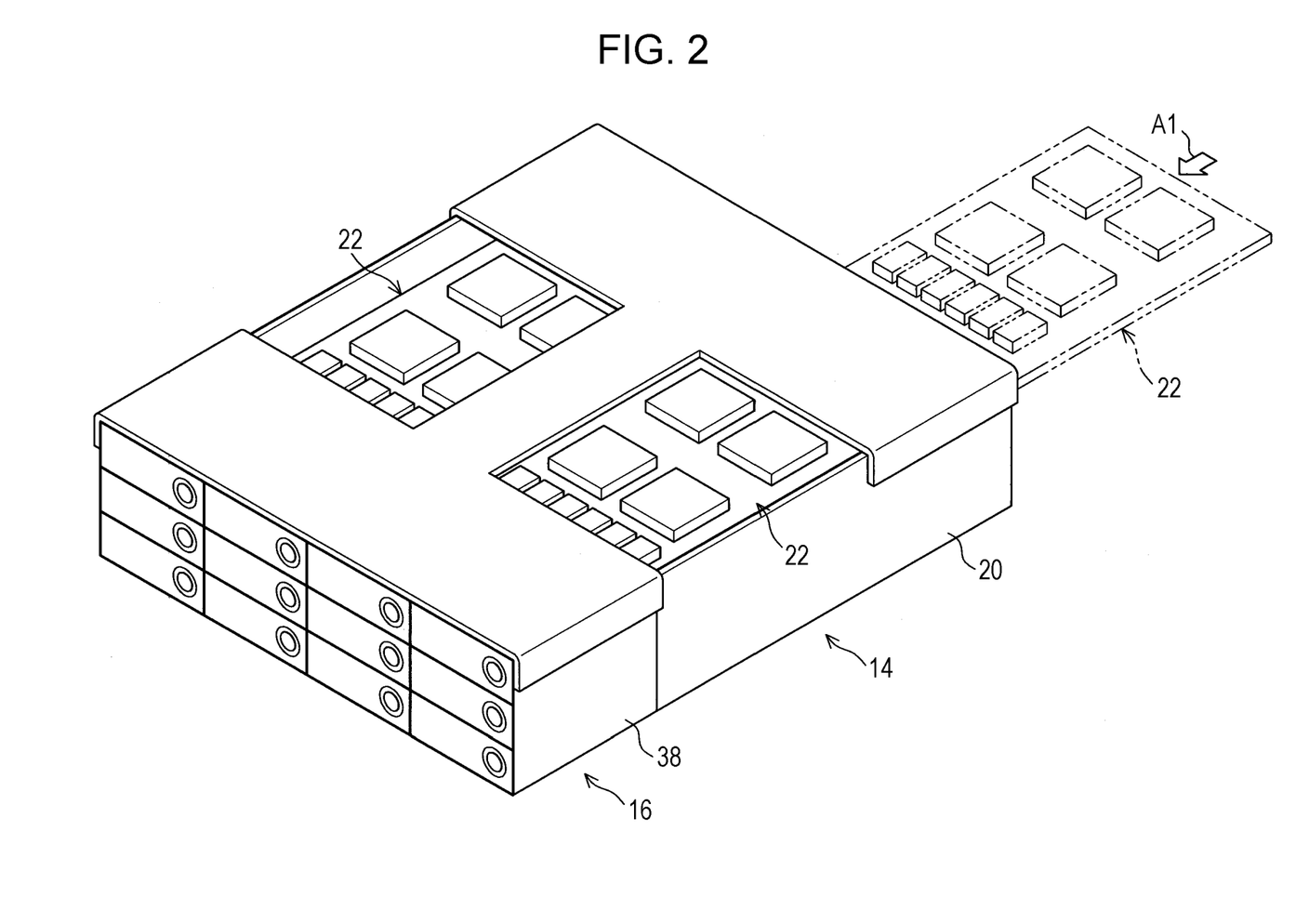
FIG. 2 is a perspective view illustrating a computer unit and a line arrangement device according to the first embodiment.
Figure 3:
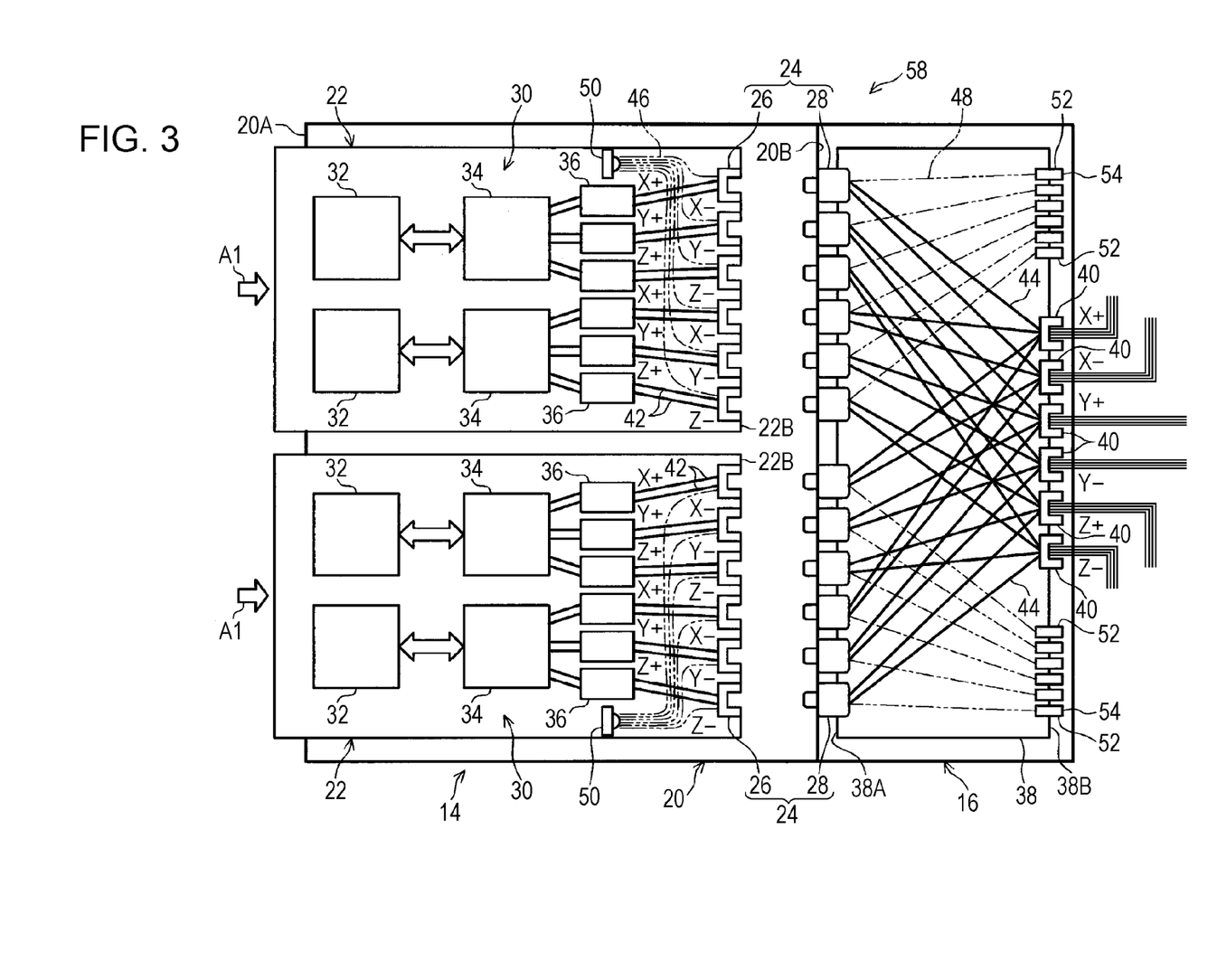
FIG. 3 is a plan view illustrating the computer unit and the line arrangement device according to line arrangement device the first embodiment.

In FIGS. 2 and 3, the computer unit 14 and a line arrangement device 16 according to the first embodiment are illustrated. In a housing 20 of the computer unit 14, a single or a plurality of (two in FIG. 3) substrates 22 are arranged. Each of the substrates 22 is inserted into and removed from the housing 20 through the opening on one end 20A side of the substrate 22. The direction in which the substrate 22 is inserted into the housing 20 is illustrated by the arrow A1 in FIGS. 2 and 3.

The substrate 22 and the line arrangement device 16 are connected to each other through a connection device 58 by light. As described later, the connection device 58 includes optical connector pairs 24 (first optical connectors 26 and second optical connectors 28), first optical fibers 46, and second optical fibers 48.

On the other end 22B of the substrate 22, the first optical connectors 26 are installed. In the example of FIG. 3, the six first optical connectors 26 are arranged on the single substrate 22 along the other end 22B of the substrate 22 in total.

On the substrate 22, an arithmetic processing device 30 is installed. In the arithmetic processing device 30 of the example illustrated in FIG. 3, information is transmitted and received between a central processing unit (CPU) 32 and a relay module 34 using an electrical signal. Between the relay module 34 side (electrical signal) and the first optical connector 26 side (optical signal), photoelectric conversion is performed on a signal by a photoelectric conversion module 36. The photoelectric conversion module 36 and the first optical connector 26 are connected to each other through a communication optical cable 42.

On the other end 20B side of the housing 20, the line arrangement device 16 is arranged. The line arrangement device 16 according to the first embodiment includes a line arrangement box 38.

Figure 4:
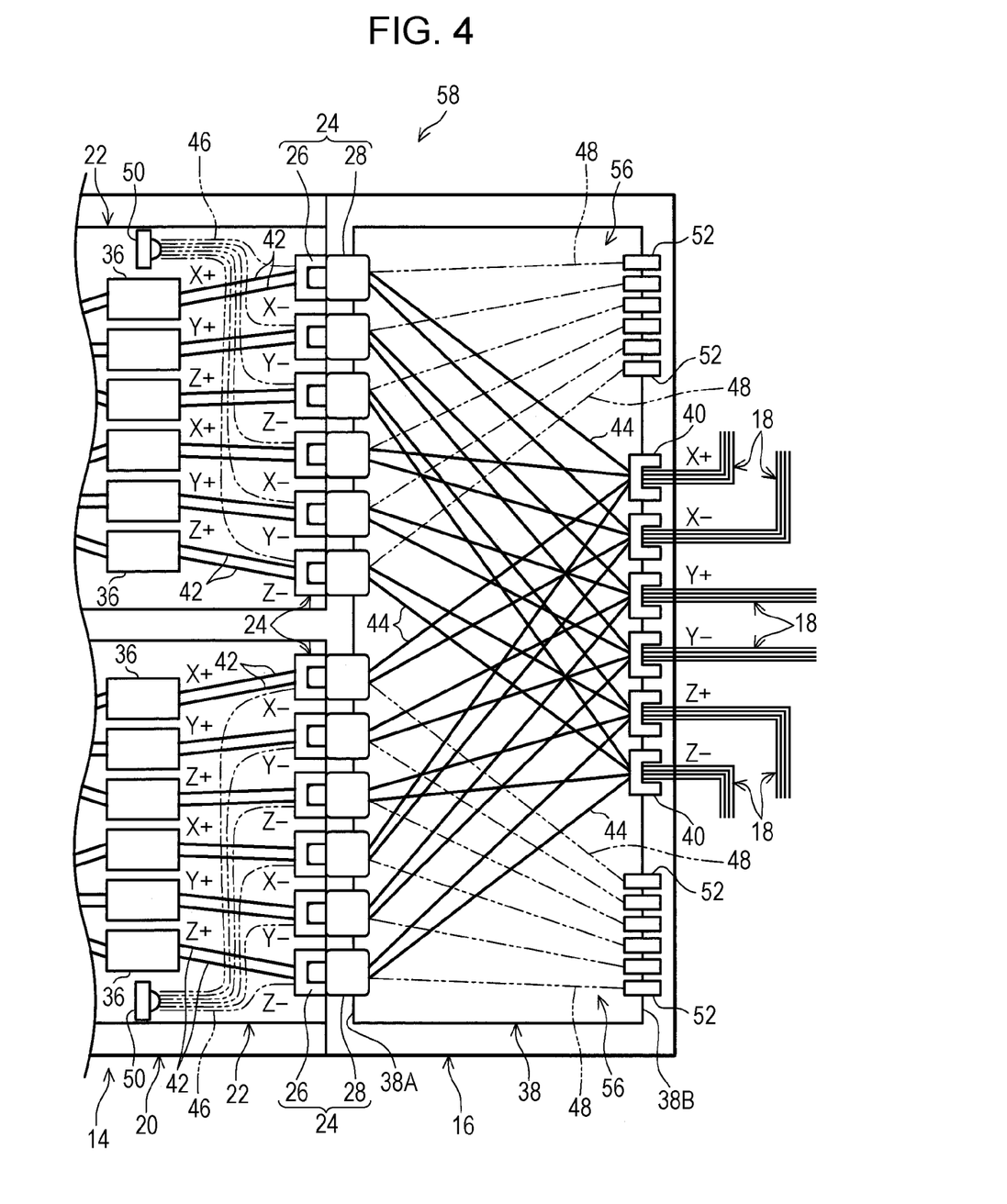
FIG. 4 is a plan view partially magnifying a connection device according to the first embodiment.

As illustrated in FIGS. 3 and 4, on one end 38A side of the line arrangement box 38, the second optical connectors 28 are provided that are respectively connected to the first optical connectors 26 by one-to-one. In the example of FIGS. 3 and 4, the single line arrangement device 16 is provided for the two substrates 22, so that the 12 second optical connectors 28 are provided for the single line arrangement box 38.

On the other end 38B side of the line arrangement box 38 of the line arrangement device 16, external connectors 40 are provided. The six external connectors 40 are provided for the single line arrangement device 16 so as to correspond to the plus (+) and minus (−) of the X direction, the Y direction, and the Z direction.

In the line arrangement device 16, the second optical connectors 28 and the external connectors 40 are connected to each other through a plurality of communication optical cables 44 by light. Using the communication optical cables 44, rearrangement (line arrangement) is performed between the second optical connectors 28 and the external connectors 40 so that the external connectors 40 correspond to the plus (+) and minus (−) of the X direction, the Y direction, and the Z direction.

A light source 50 is installed on each of the substrates 22. In the example illustrated in FIGS. 3 and 4, the single light source 50 is installed for the single substrate 22. The light source 50 is connected to each of the first optical connectors 26 through the first optical fiber 46. The first optical fiber 46 guides light from the light source 50 to a terminal (pin) in the first optical connector 26, which is not used to transmit and receive an optical signal to and from the second optical connector 28. The first optical fiber 46 is an example of a guide light member.

The line arrangement device 16 includes a visual recognition member 56. In the example illustrated in FIGS. 3 and 4, the visual recognition member 56 includes the second optical fiber 48 and a window member 52.

The window member 52 is provided on the other end 38B side of the line arrangement box 38 of the line arrangement device 16. The window members 52 respectively correspond to the second optical connectors 28 by one-to-one. The second optical connectors 28 are respectively connected to the window members 52 through the second optical fibers 48. The second optical fiber 48 guides light to the window member 52 from a terminal (pin) in the second optical connector 28, which is not used to transmit and receive an optical signal to and from the first optical connector 26.

The window member 52 is, for example, a tubular member inside which light is allowed to pass through. The window member 52 includes a visual check section 54 on the other side to the connection side of the second optical connector 28.

When the light source 50 emits light in a state in which the first optical connector 26 and the second optical connector 28 are connected to each other correctly, the light reaches the window member 52 through the first optical fiber 46, the first optical connector 26, the second optical connector 28, and the second optical fiber 48. That is, it may be checked whether or not the first optical connector 26 and the second optical connector 28 are connected to each other correctly by viewing the window member 52 from the visual check section 54 side and checking whether or not the light from the light source 50 has arrived.

A lens, a diffuser panel, or the like, which is used to guide light to the visual check section 54, may be provide in the window member 52 to improve the visibility.

In the first embodiment, the first optical connector 26 is "one of optical connectors", and the second optical connector 28 is "the other optical connector". In addition, the substrate 22 is an example of a first mounting member.

An operation of the embodiment is described below.

As illustrated by the arrow A1 in FIGS. 2 and 3, the substrate 22 is inserted into the housing 20 through the opening on the one end 20A side of the housing 20, and the first optical connector 26 of the substrate 22 is connected to the second optical connector 28 of the line arrangement device 16. In addition, when the light source 50 is caused to emit light, the light from the light source 50 is guided to a terminal of the first optical connector 26 (terminal that is not used to transmit and receive an optical signal to and from the second optical connector 28) through the first optical fiber 46.

Here, as illustrated in FIG. 4, when the first optical connector 26 and the second optical connector 28 are securely connected to each other, light from the light source 50 passes through from a terminal of the first optical connector 26 to a terminal of the second optical connector 28. In addition, the light reaches the window member 52 through the second optical fiber 48 from the terminal of the second optical connector 28. Thus, it may be determined that the first optical connector 26 and the second optical connector 28 are securely connected to each other when the light is visually recognized by visual check of the visual check section 54.

On the contrary, when the light is not visually recognized after the visual check section 54 has been visually checked (or when the light is weaker than expected), it may be determined that the first optical connector 26 and the second optical connector 28 are not securely connected to each other. In this case, for example, it is sufficient to perform re-connection between the first optical connector 26 and the second optical connector 28 by inserting the substrate 22 into the housing 20 again, or the like.

After check of the connection state between the first optical connector 26 and the second optical connector 28 has been completed, light-emission of the light source 50 is terminated.

As described above, in the first embodiment, the connection state between the first optical connector 26 and the second optical connector 28 may be checked by visual recognition of the visual check section 54 of the window member 52. In particular, the first optical connector 26 is located away from the one end 20A side of the housing 20 in the state in which the first optical connector 26 and the second optical connector 28 are connected to each other, so that it is difficult to visually check the connection state from the one end 20A side of the housing 20.

When the connection between the first optical connector 26 and the second optical connector 28 is incomplete, the first optical connector 26 may be located on the left side of FIG. 3 as compared with the normal connection state. For example, when the insertion length of the substrate 22 in the arrow A1 direction is insufficient, the connection between the first optical connector 26 and the second optical connector 28 becomes incomplete. Therefore, by inserting a rod or the like from the one end 20A side of the housing 20, the position of the first optical connector 26 may be determined from the insertion length when the rod is in contact with the first optical connector 26. In addition, the connection state between the first optical connector 26 and the second optical connector 28 may be checked by determining the position of the first optical connector 26. However, it may be difficult to perform such an operation because the rod is inserted into the housing 20 and is caused to contact the first optical connector 26. On the contrary, in the embodiment, the visual check section 54 of the window member 52 is visually checked, so that the connection state between the first optical connector 26 and the second optical connector 28 is checked easily.

In addition, a method is also conceivable in which a sensor is provided in order to check the connection state between the first optical connector 26 and the second optical connector 28. However, when the sensor is provided, an increase in the cost may be caused due to the provision of the sensor and a cable that is used to transmit and receive an electrical signal to and from the sensor. In the embodiment, the connection state between the first optical connector 26 and the second optical connector 28 may be checked using redundant pins of the first optical connector 26 and the second optical connector 28 without such a sensor, thereby suppressing the increase in the cost.

In the first embodiment, the single light source 50 is shared between the plurality of (six in the example illustrated in FIG. 1) first optical connectors 26, so that, for example, a reduction in the cost and weight may be achieved as compared with a structure in which a light source is provided in each of the first optical connectors 26. Even in a structure in which a plurality of first optical connectors 26 is grouped, and a single light source is provided for each of the groups, a reduction in the cost and weight may be achieved as compared with the structure in which the light source is provided for each of the first optical connectors 26.

Light from the light source 50 is guided to the first optical connector 26 through the first optical fiber 46. In such a structure, the light may be guided to the first optical connector 26 while the diffusion of light is suppressed as compared with a structure in which the first optical fiber 46 is not included, for example, a structure in which light from the light source 50 is directly emitted to the first optical connector 26. In addition, the light from the light source 50 is guided to the first optical connector 26 through the first optical fiber 46, so that the light source 50 may be located away from the first optical connector 26. In addition, even when a further member is located between the light source 50 and the first optical connector 26, the light from the light source 50 may be guided to the first optical connector 26. Therefore, the degree of freedom is high for the design of the substrate 22 and the arrangement of the members.

The same number of the first optical fibers 46 as the plurality of first optical connectors 26 is provided, and the first optical connectors 26 respectively correspond to the first optical fibers 46 by one-to-one. Thus, light may be reliably guided from the light source 50 to each of the first optical connectors 26.

In the first embodiment, the first optical connectors 26 and the light source 50 are installed on the substrate 22. The substrate 22 is an example of a first mounting member. That is, the first optical connectors 26 and the light source 50 are integrated so as to be installed on the first mounting member, so that, for example, handling of such a structure becomes easy as compared with a structure in which the light source 50 is provided separately from the substrate 22.

In the first embodiment, the visual recognition member includes the window member 52 and the second optical fiber 48, and light is reliably guided to the window member 52 from the second optical connector 28. In addition, the connection state between the first optical connector 26 and the second optical connector 28 may be easily checked by visual check of the visual check section 54 of the window member 52.

In particular, the single line arrangement device 16 includes the plurality of (12 in the example illustrated in FIGS. 3 and 4) second optical connectors 28, and the window members 52 the number of which is same as the number of second optical connectors 28 are provided. In addition, each of the second optical fibers 48 guides light from the second optical connector 28 to the window member 52. The plurality of second optical connectors 28 respectively corresponds to the window members 52 by one-to-one, so that the connection state of each of the plurality of optical connector pairs 24 may be checked individually.

A connection device 62 according to the second embodiment is described below. In the second to sixth embodiments that are described later, the entire structure of the computer system 12 is similar to that of the first embodiment, so that the description is omitted herein. In addition, in the second embodiment, the same symbol is assigned to an element, a member, or the like that is similar to that of the first embodiment, and the detailed description is omitted.

In the below description, for convenience of description, combinations of the plurality of first optical connectors 26 and the corresponding second optical connectors 28 the number of which is same as the first optical connectors 26 in the single substrate 22 are regarded as a connector group 64. In the example illustrated in FIG. 5, there are two substrates 22, so that the number of connector groups 64 is also two. In addition, the single connector group 64 includes six optical connector pairs 24.

Figure 5:
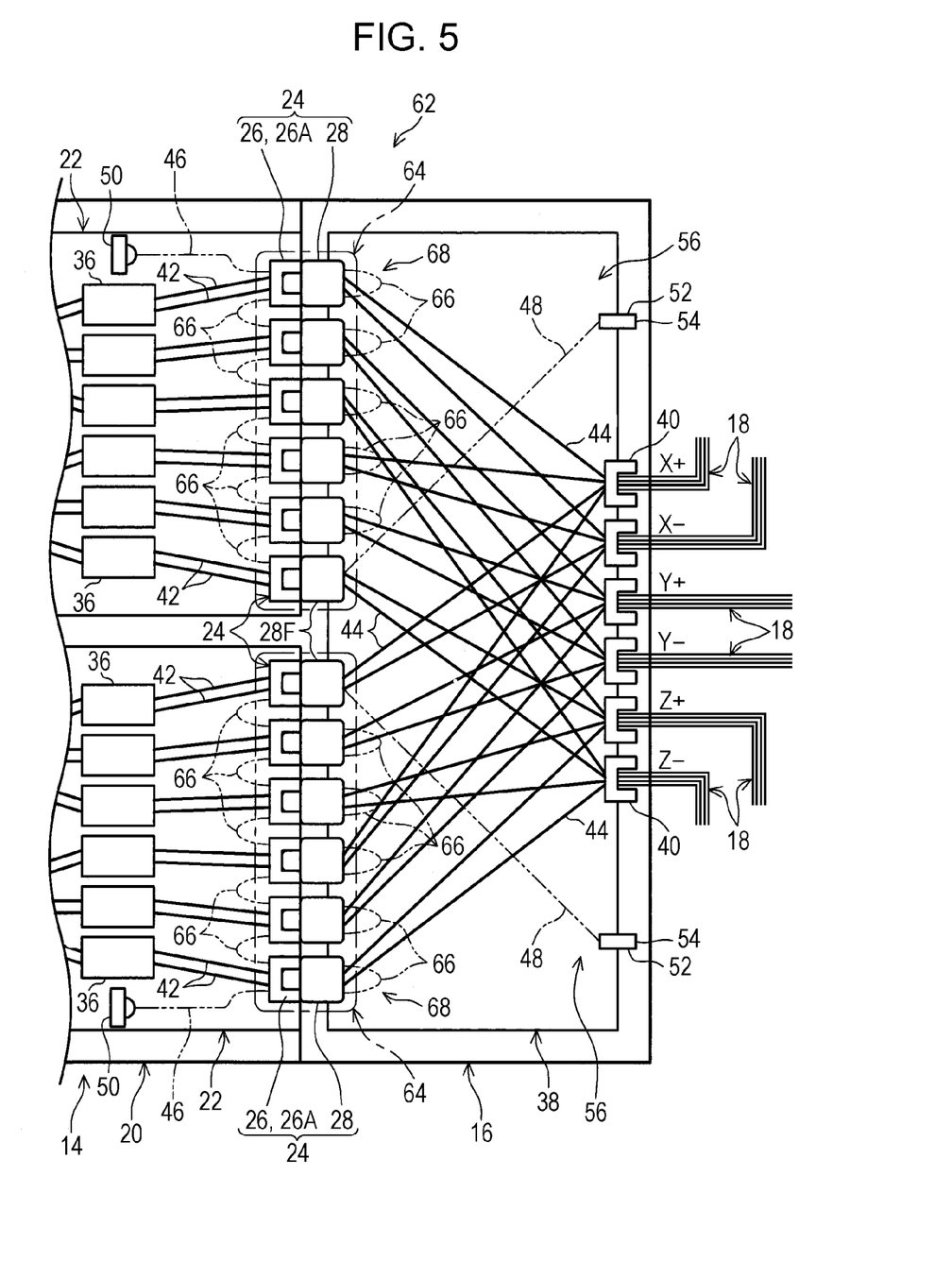
FIG. 5 is a plan view partially magnifying a connection device according to a second embodiment.

In the substrate 22 according to the second embodiment, in the connector group 64, the first optical fiber 46 guides light from the light source 50 to the first optical connector 26A at one end in the arrangement direction from among the plurality of first optical connectors 26.

In addition, in the second embodiment, in the line arrangement device 16, the window members 52 the number of which is the same as the number of connector groups 64 are provided. In addition, in each of the connector groups 64, the second optical fiber 48 guides light between the window member 52 and the second optical connector 28F at the other end in the arrangement direction from among the plurality of second optical connectors 28.

In the connector group 64, between the first optical connector 26A at the one end in the arrangement direction and the second optical connector 28F at the other end in the arrangement direction, the optical connector pairs 24 are connected to each other through optical fibers 66 to form a light guide 68. When light that passes through the light guide 68 is regarded as a reference, the first optical connector 26A is the beginning end, and the second optical connector 28F is the terminal end.

In the second embodiment, when the light source 50 emits light in the state in which the first optical connector 26 and the second optical connector 28 are securely connected to each other, the light enters the first optical connector 26A from the first optical fiber 46, and passes through the light guide 68. That is, the light passes through the respective optical connector pairs 24 in turn. In addition, the light reaches the window member 52 through from the second optical connector 28F to the second optical fiber 48. That is, in the second embodiment, the connection state between the first optical connector 26 and the second optical connector 28 may be easily recognized by visually recognizing the visual check section 54 of the window member 52.

In the second embodiment, the light guide 68 is formed, and light is guided from the first optical connector 26A to the second optical connector 28F through the light guide 68, so that it is only sufficient to provide the single second optical fiber 48 and the single window member 52 for a single connector group. Therefore, simplification of the structure, and a reduction in the weight and cost of the structure may be achieved in the line arrangement device 16.

The first optical fiber 46 is connected to the first optical connector 26A that is located at the beginning end in the arrangement direction of the first optical connectors 26, in the connector group 64. The second optical fiber 48 is connected to the second optical connector 28F that is located at the terminal end in the arrangement direction of the second optical connectors 28, in the connector group 64. In addition, the light guide 68 that passes through the respective optical connector pairs 24 is formed between the first optical connector 26A at the beginning end and the second optical connector 28F at the terminal end. Therefore, the light may be guided to all of the first optical connectors 26 and the second optical connectors 28 in the connector group 64.

In the second embodiment, it is said that the first optical connector 26 is an example of "one of optical connectors", and the second optical connector 28 is an example of "the other optical connector". However, there is also a connector pair in which light passes through from the second optical connector 28 to the first optical connector 26. In such a connector pair, it is also said that the second optical connector 28 is an example of "one of optical connectors", and the first optical connector 26 is an example of "the other optical connector". In addition, the substrate 22 is an example of "first mounting member".

A connection device 72 according to a third embodiment is described below. In the third embodiment, the same symbol is assigned to an element, a member, or the like that is similar to that of the first embodiment or the second embodiment, and the detailed description is omitted herein.

Figure 6:
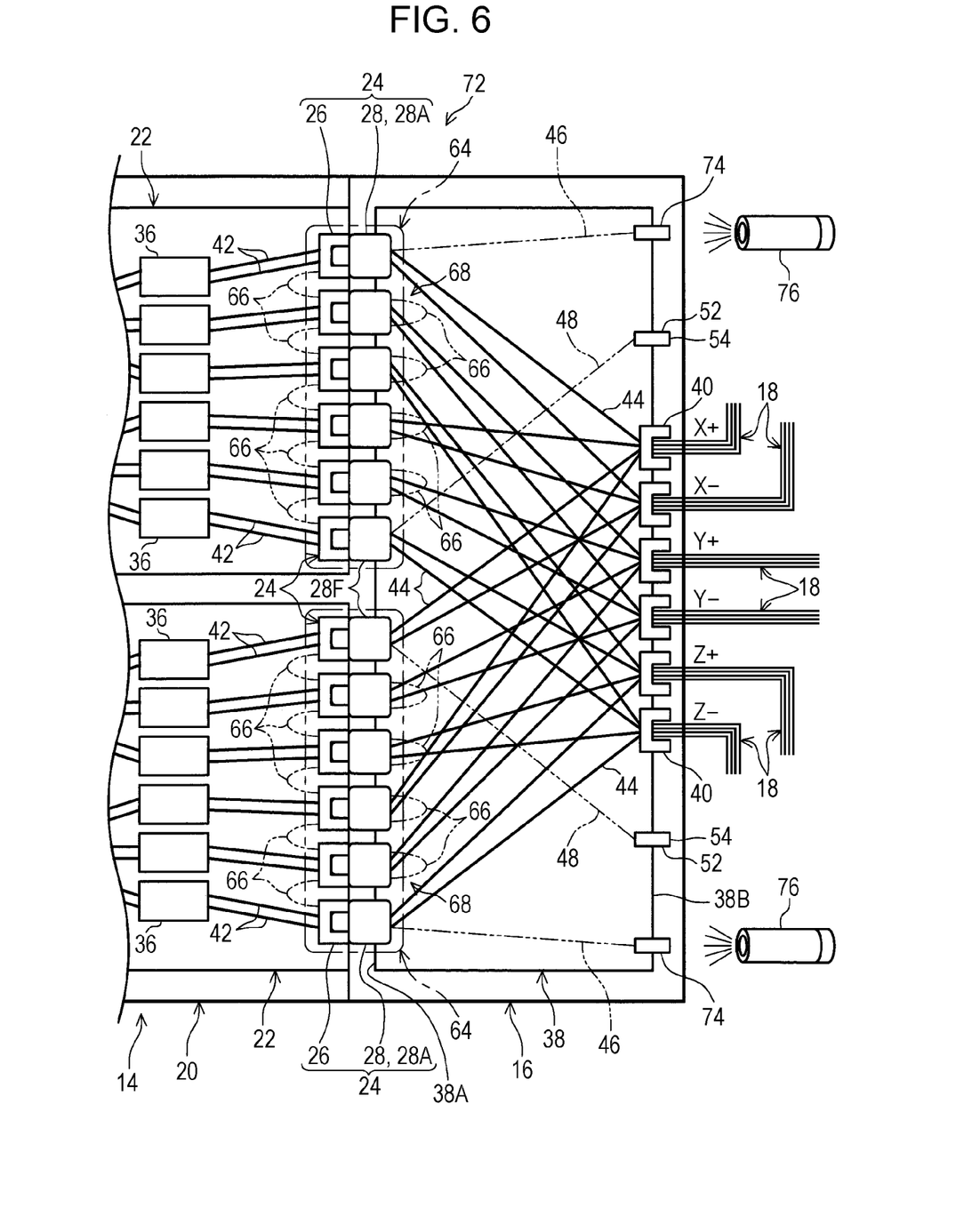
FIG. 6 is a plan view partially magnifying a connection device according to a third embodiment.

In the third embodiment, as illustrated in FIG. 6, a light reception member 74 is provided in the line arrangement device 16. In the example illustrated in FIG. 6, the light reception member 74 is installed on the other end 38B side of the line arrangement box 38. In addition, the first optical fiber 46 is provided between the light reception member 74 and the second optical connector 28A on the one end side of the connector group 64.

In the third embodiment, a light source 76 is used that is provided separately from the substrate 22 and the line arrangement device 16. When light from the light source 76 is emitted to the light reception member 74, the light enters the second optical connector 28A through the first optical fiber 46, passes through the light guides 68 and 66, and reaches the window member 52 through from the second optical connector 28F to the second optical fiber 48. That is, in the third embodiment, the connection state between the first optical connector 26 and the second optical connector 28 may be easily checked by visually recognizing the visual check section 54 of the window member 52.

In the third embodiment, light is guided from the second optical connector 28A to the second optical connector 28F through the light guide 68, so that it is only sufficient to provide the single second optical fiber 48 and the single window member 52 for the single connector group. Therefore, simplification of the structure and a reduction in the weight and cost of the structure may be achieved in the line arrangement device 16.

The first optical fiber 46 is connected to the second optical connector 28A that is located at the beginning end in the connector group 64. The second optical fiber 48 is connected to the second optical connector 28F that is located at the terminal end in the connector group 64. Therefore, light may be guided through all of the first optical connectors 26 and the second optical connectors 28 in the connector group 64.

In the third embodiment, the light source 76 is provided separately from the substrate 22 and the line arrangement device 16. Therefore, a reduction in the weight and cost of the substrate 22 and the line arrangement device 16 may be achieved. The light source 76 may be shared with a further connection device 72.

In the third embodiment, as illustrated in FIG. 6, both of the light reception member 74 and the window member 52 are arranged on the other end 38B side of the line arrangement box 38. A work position in which the light reception member 74 is lighted by the light source 50 is close to a work position in which the window member 52 is visually recognized, so that the connection state between the first optical connector 26 and the second optical connector 28 is easily checked.

In the third embodiment, it is said that the second optical connector 28 is an example of "one of optical connectors", and the first optical connector 26 is an example of "the other optical connector". However, there may be also a connector pair in which light passes through from the first optical connector 26 to the second optical connector 28. In such a connector pair, it is also said that the first optical connector 26 is an example of "one of optical connectors", and the second optical connector 28 is an example of "the other optical connector". In addition, the line arrangement box 38 is an example "second mounting member".

A connection device 82 according to a fourth embodiment is described below. In the fourth embodiment, the same symbol is assigned to an element, a member, or the like that is similar to that of the first, second, or third embodiment, and the detailed description is omitted herein.

Figure 7:
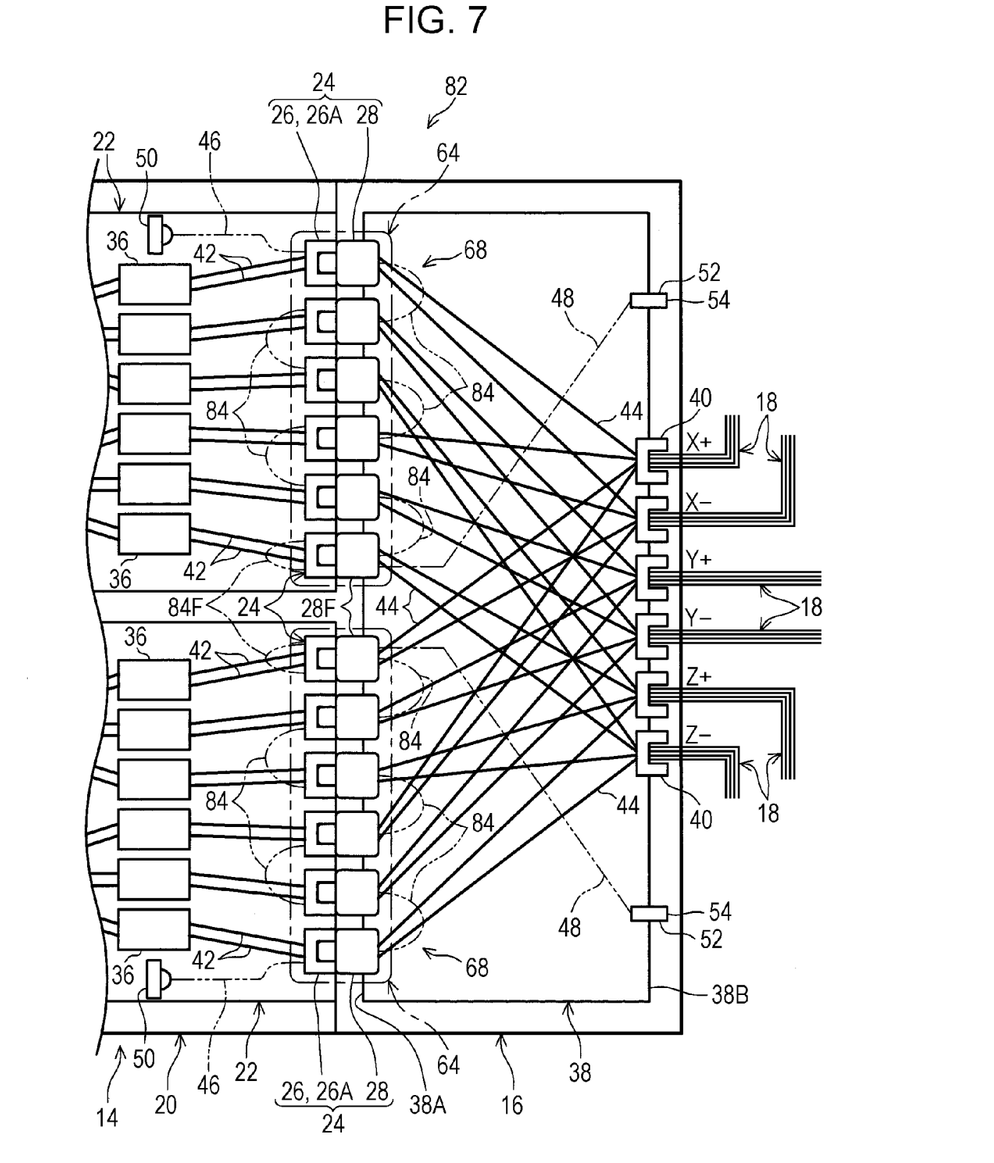
FIG. 7 is a plan view partially magnifying a connection device according to a fourth embodiment.

In the fourth embodiment, as illustrated in FIG. 7, the light source 50 and the first optical fiber 46 are provided in the substrate 22. The first optical fiber 46 is connected to the first optical connector 26A on the one end side of the connector group 64. The second optical fiber 48 may be provided between the window member 52 and the second optical connector 28F on the other end side of the connector group 64.

In addition, in the fourth embodiment, through optical fibers 84, the second optical connector 28A and the second optical connector 28B are connected each other, and the second optical connector 28C and the second optical connector 28D are connected to each other, and the second optical connector 28E and the second optical connector 28F are connected to each other. In addition, through the optical fibers 84, the first optical connector 26B and the first optical connector 26C are connected to each other, and the first optical connector 26D and the first optical connector 26E are connected to each other. In addition, an optical fiber 84F is provided that emits light from a terminal that is different from a terminal to which light enters, in the first optical connector 26F.

In the fourth embodiment, light from the light source 50 enters the first optical connector 26A through the first optical fiber 46, passes through the light guide 68, and reaches the window member 52 through from the second optical connector 28F to the second optical fiber 48. That is, in the fourth embodiment, the connection state between the first optical connector 26 and the second optical connector 28 may be easily checked by visually recognizing the visual check section 54 of the window member 52.

In the fourth embodiment, the number of optical fibers 84 in the single connector group 64 is small as compared with the second embodiment and the third embodiment, so that a reduction in the weight and cost may be achieved.

In the fourth embodiment, a connector pair in which the first optical connector 26 is an example of "one of optical connectors", and the second optical connector 28 is an example of "the other optical connector", and a connector pair having the inverse positional relationship to such a connector pair are arranged alternately. In addition, the substrate 22 is an example of "first mounting member".

A connection device 102 according to a fifth embodiment is described below. In the fifth embodiment, the same symbol is assigned to an element, a member, or the like that is similar to that of the first, second, third, or fourth embodiment, and the detailed description is omitted herein.

Figure 8:
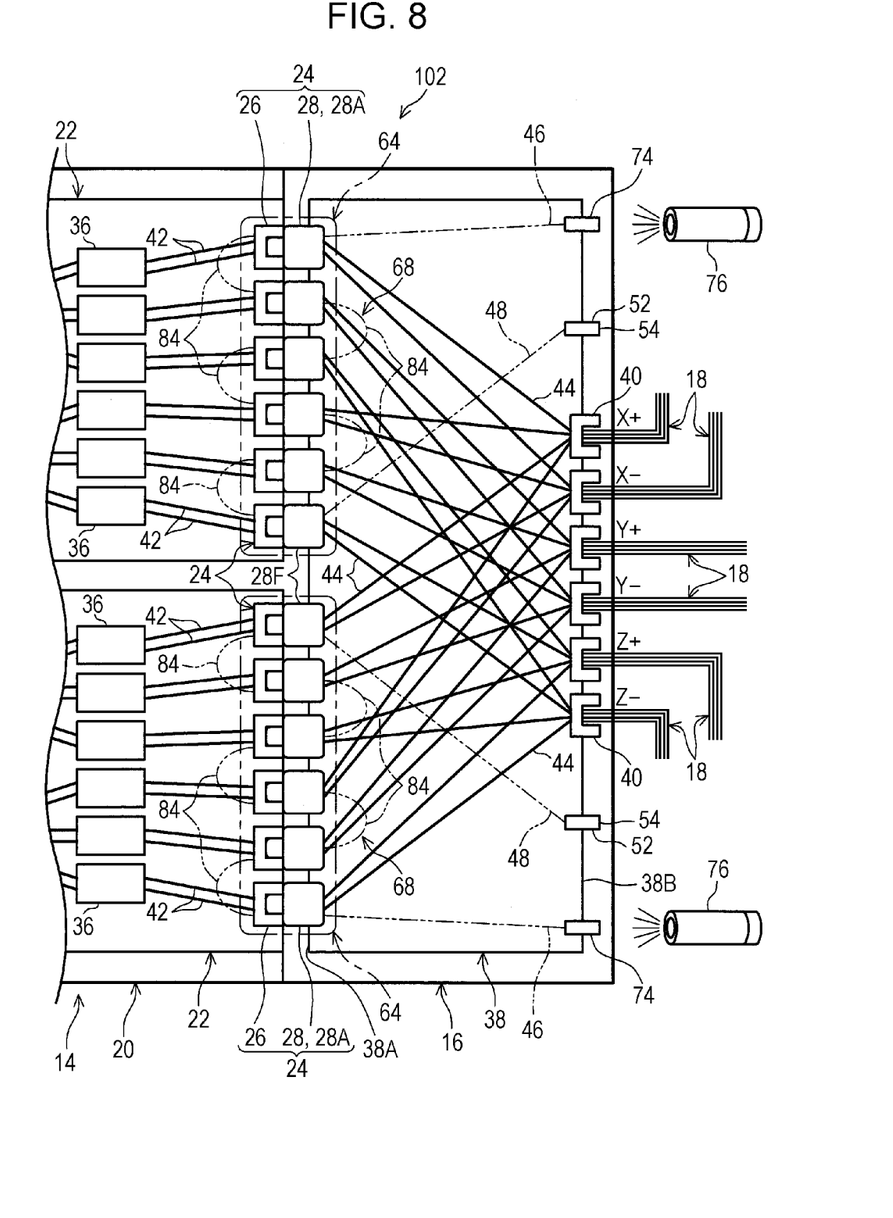
FIG. 8 is a plan view partially magnifying a connection device according to a fifth embodiment.

In the fifth embodiment, as illustrated in FIG. 8, the light reception member 74 is provided in the line arrangement device 16. In the example illustrated in FIG. 8, the light reception member 74 is installed on the other end 38B side of the line arrangement box 38. In addition, the first optical fiber 46 is provided between the light reception member 74 and the second optical connector 28A on the beginning end side of the connector group 64.

In the fifth embodiment, through the optical fibers 84, the first optical connector 26A and the first optical connector 26B are connected to each other, and the first optical connector 26C and the first optical connector 26D are connected to each other, and the first optical connector 26E and the first optical connector 26F are connected to each other. In addition, through the optical fibers 84, the second optical connector 28B and the second optical connector 28C are connected to each other, and the second optical connector 28D and the second optical connector 28E are connected to each other.

In the fifth embodiment, the light source 76 is used that is provided separately from the substrate 22 and the line arrangement device 16. When light from the light source 76 is emitted to the light reception member 74, the light enters the second optical connector 28A through the first optical fiber 46, passes through the light guide 68, and reaches the window member 52 through from the second optical connector 28F to the second optical fiber 48. That is, in the fifth embodiment, the connection state between the first optical connector 26 and the second optical connector 28 may be easily checked by visually recognizing the visual check section 54 of the window member 52.

In the fifth embodiment, the number of optical fibers 84 in the single connector group 64 is small as compared with the second embodiment and the third embodiment, so that a reduction in the weight and cost may be achieved.

In addition, in the fifth embodiment, the light source 76 is provided separately from the substrate 22 and the line arrangement device 16. Therefore, a reduction in the weight and cost of the substrate 22 and the line arrangement device 16 may be achieved. The light source 76 may be shared with a further connection device 72.

In the fifth embodiment, a connector pair in which the first optical connector 26 is an example of "one of optical connectors", and the second optical connector 28 is an example of "the other optical connector", and a connector pair having the inverse positional relationship to such a connector pair are arranged alternately. In addition, the line arrangement box 38 is an example of "second mounting member".

A connection device 112 according to a sixth embodiment is described below. In the sixth embodiment, the same symbol is assigned to an element, a member, or the like that is similar to that of the first, second, third, fourth, or fifth embodiment, and the detailed description is omitted herein.

Figure 9:
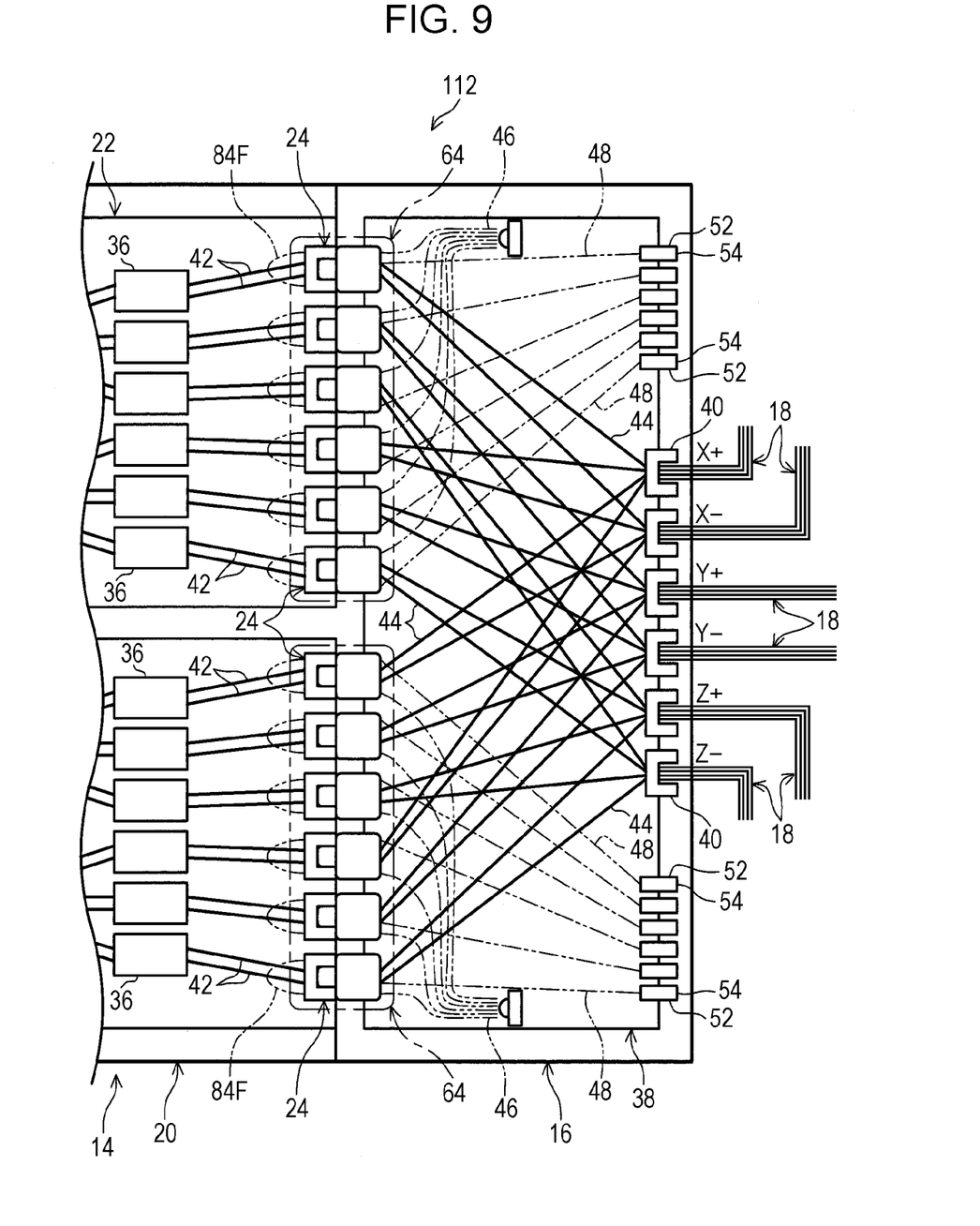
FIG. 9 is a plan view partially magnifying a connection device according to a sixth embodiment.

In the sixth embodiment, as illustrated in FIG. 9, the light source 50 is provided in the line arrangement device 16. In the example illustrated in FIG. 9, the light sources 50 are provided so as to respectively correspond to the connector groups 64. In addition, the first optical fiber 46 is provided between the light source 50 and each of the second optical connectors 28 in the connector group 64.

In addition, in the sixth embodiment, in each of the first optical connectors 26, the optical fiber 84F is provided that emits light from a terminal that is different from a terminal to which light enters.

In the sixth embodiment, light from the light source 50 enters the second optical connector 28 through the first optical fiber 46. When the first optical connector 26 and the second optical connector 28 are securely connected to each other, the light enters the first optical connector 26. In addition, the light that has been emitted from the first optical connector 26 returns to the first optical connector 26 through the optical fiber 84F. The light reaches the window member 52 through from the second optical connector 28 to the second optical fiber 48. That is, in the sixth embodiment, the connection state between the first optical connector 26 and the second optical connector 28 may be easily checked by visually recognizing the visual check section 54 of the window member 52.

In the sixth embodiment, it is said that the second optical connector 28 is an example of "one of optical connectors", and the first optical connector 26 is an example of "the other optical connector". However, light also passes through from the first optical connector 26 to the second optical connector 28, and it may be also said that the first optical connector 26 is an example of "one of optical connectors", and the second optical connector 28 is an example of "the other optical connector". In addition, the line arrangement box 38 is an example of "second mounting member".

A connection device 122 according to a seventh embodiment is described below. In the seventh embodiment, the same symbol is assigned to an element, a member, or the like that is similar to that of the first, second, third, fourth, fifth, or sixth embodiment, and the detailed description is omitted herein.

Figure 10:
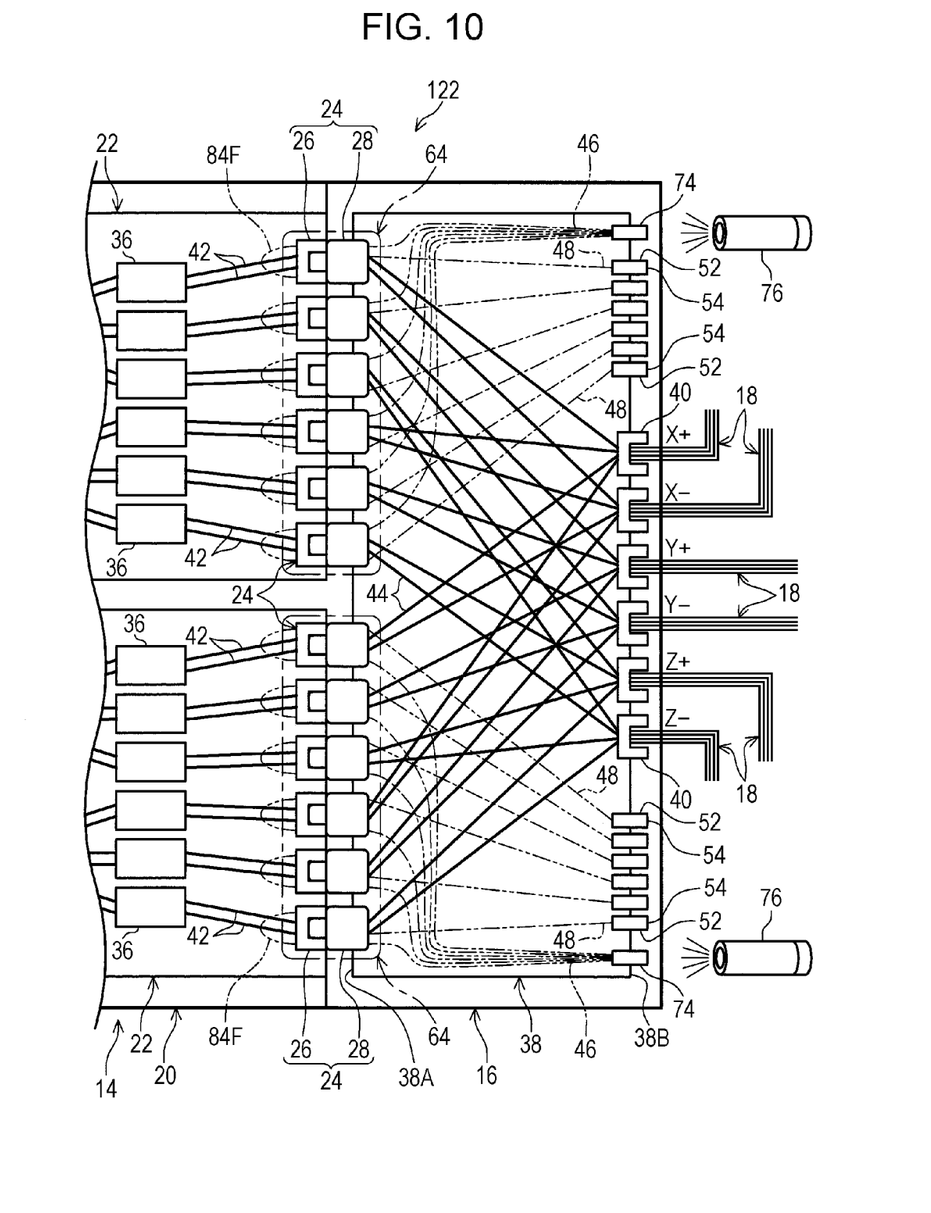
FIG. 10 is a plan view partially magnifying a connection device according to a seventh embodiment.

In the seventh embodiment, as illustrated in FIG. 10, the light reception member 74 is provided in the line arrangement device 16. In the example illustrated in FIG. 10, the light reception member 74 is installed on the other end 38B side of the line arrangement box 38. In addition, the first optical fiber 46 is provided between the light reception member 74 and each of the second optical connectors 28 in the connector group 64.

In addition, in the seventh embodiment, in each of the first optical connectors 26, the optical fiber 84F is provided that emits light from a terminal that is different from a terminal that light enters.

In the seventh embodiment, when light from the light source 76 is emitted to the light reception member 74, the light enters the second optical connector 28 through the first optical fiber 46. When the first optical connector 26 and the second optical connector 28 are securely connected to each other, the light enters the first optical connector 26. In addition, the light that has been emitted from the first optical connector 26 is returned to the first optical connector 26 through the optical fiber 84F. The light reaches the window member 52 through from the second optical connector 28 to the second optical fiber 48. That is, in the sixth embodiment, the connection state between the first optical connector 26 and the second optical connector 28 may be easily checked by visually recognizing the visual check section 54 of the window member 52.

In addition, in the seventh embodiment, the light source 76 is provided separately from the substrate 22 and the line arrangement device 16. Therefore, a reduction in the weight and cost of the substrate 22 and the line arrangement device 16 may be achieved. The light source 76 may be shared with a further connection device 72.

In the seventh embodiment, it is said that the second optical connector 28 is an example "one of optical connectors", and the first optical connector 26 is an example "the other optical connector". However, it is also said that the first optical connector 26 is an example of "one of optical connectors", and the second optical connector 28 is an example of "the other optical connector" because light also passes through from the first optical connector 26 to the second optical connector 28. In addition, the line arrangement box 38 is an example of "second mounting member".

Figure 11:
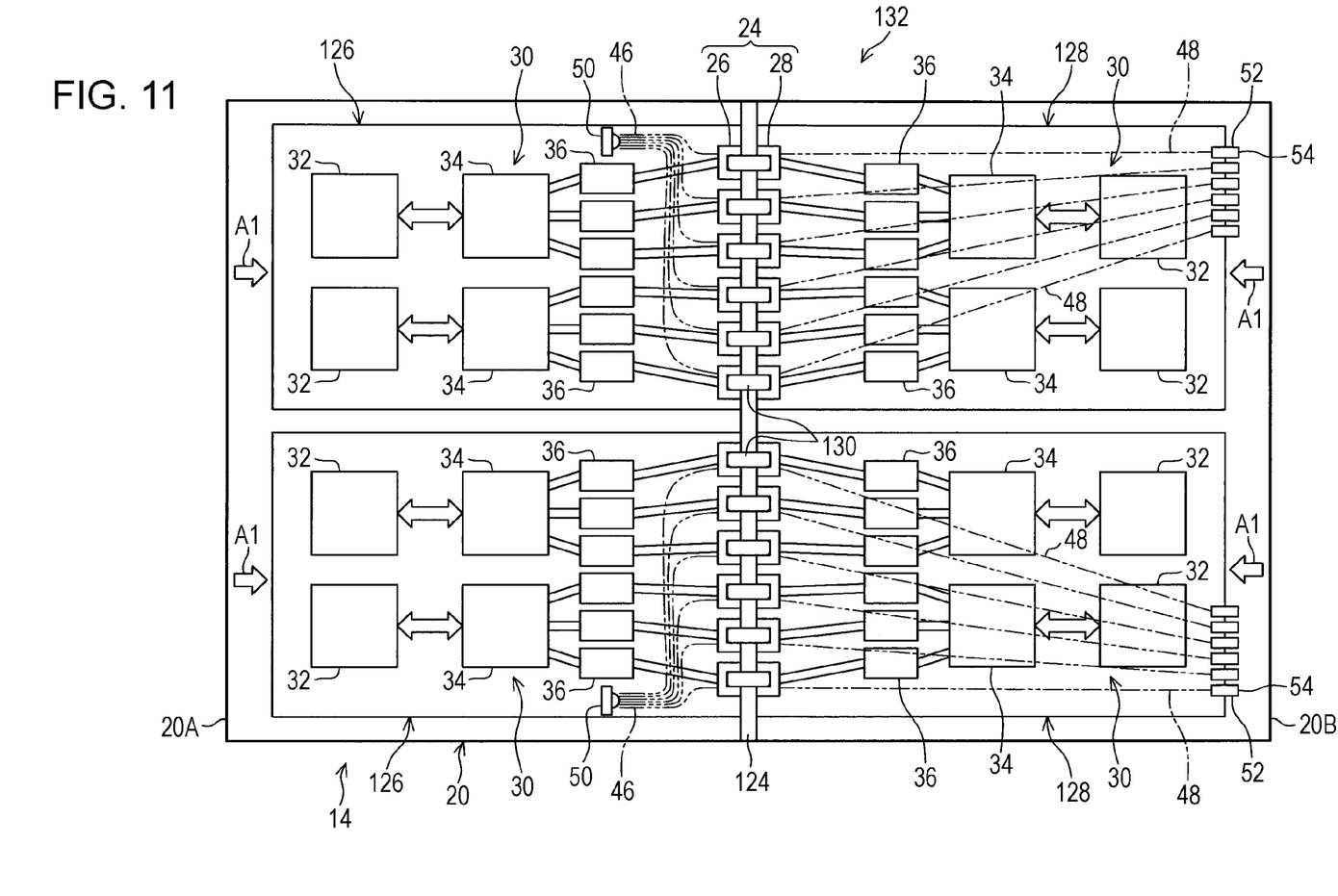
FIG. 11 is a plan view partially magnifying a connection device according to an eighth embodiment.

A connection device 132 according to an eighth embodiment is described below. As illustrated in FIG. 11, in the connection device 132 according to the eighth embodiment, an intermediate plate 124 is provided inside the housing 20. One or more substrates 126 and one or more substrates 128 are inserted in the arrow A1 directions from both sides of the intermediate plate 124. The number of first optical connectors 26 that are provided in the substrate 126 is same as the number of second optical connectors 28 that are provided in the substrate 128. Relay connectors 130 the number of which is same as the first optical connector 26 are provided in the intermediate plate 124. The first optical connector 26 and the second optical connector 28 are connected to each other through the relay connector 130.

The light source 50 and the first optical fibers 46 are provided in the substrate 126. In the example illustrated in FIG. 11, the single light source 50 is provided for the single substrate 22, and the number of first optical fibers 46 is same as the number of first optical connectors 26. In addition, light from the light source 50 is guided to the first optical connector 26 through the first optical fiber 46.

The window members 52 and the second optical fibers 48 are provided in the substrate 128. In the example illustrated in FIG. 11, the number of window members 52 and the number of second optical fibers 48 are the same as the number of second optical connectors 28. In addition, the light of the second optical connector 28 is guided from the second optical fiber 48 to the corresponding window member 52.

In the eighth embodiment, when the light source 50 emits light in a state in which the first optical connector 26 and the second optical connector 28 are connected to each other through the relay connector 130, the light enters the first optical connector 26 through the first optical fiber 46, passes through the relay connector 130, and reaches the second optical connector 28. In addition, the light reaches the window member 52 through the second optical fiber 48. That is, in the eighth embodiment, the connection state between the first optical connector 26 and the second optical connector 28 may be easily checked by visually recognizing the visual check section 54 of the window member 52.

In the eighth embodiment, the first optical connector 26 is an example of "one of optical connectors", and the second optical connector 28 is an example of "the other optical connector". In addition, the substrate 126 is an example of "first mounting member".

Figure 12:
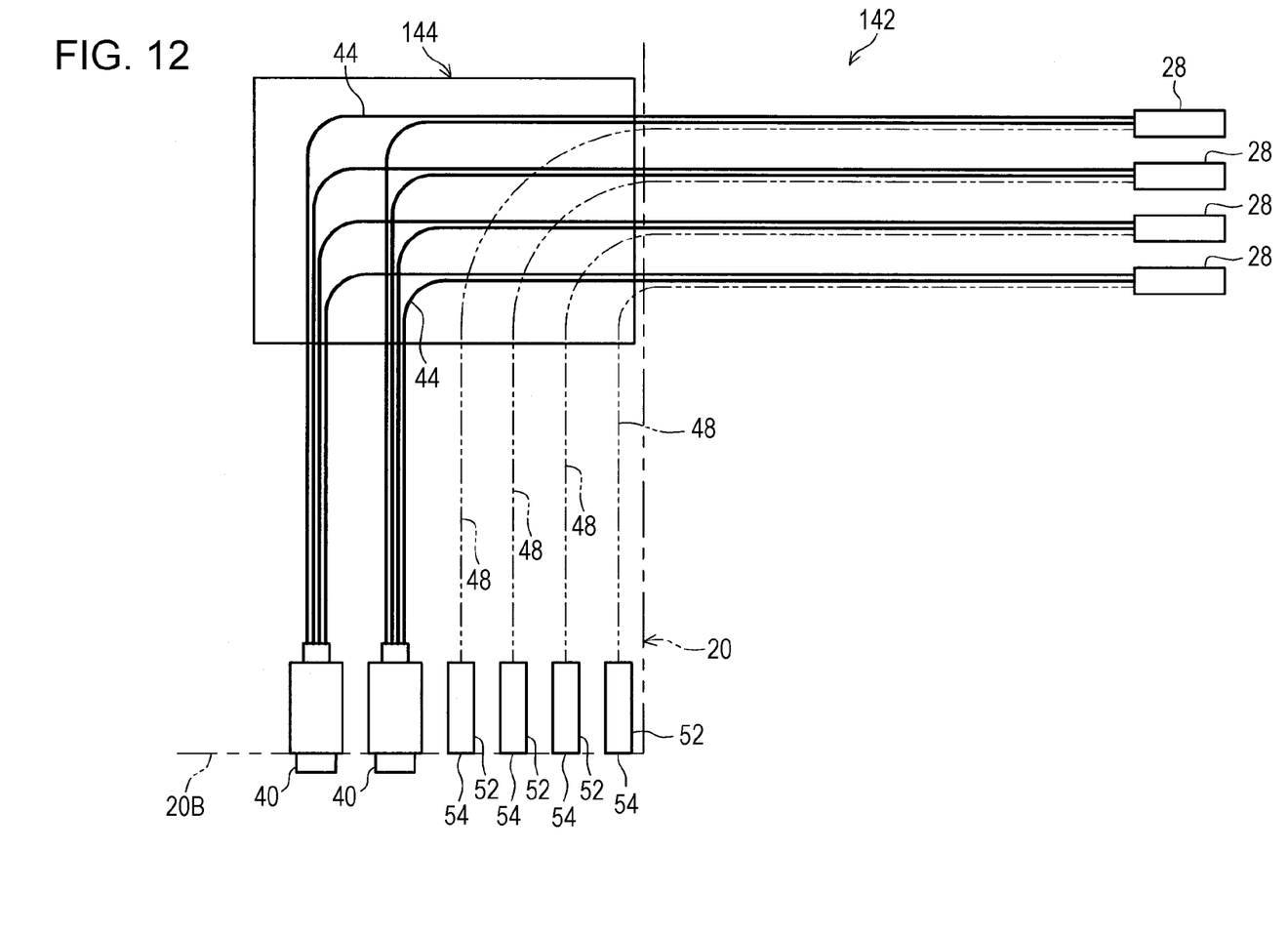
FIG. 12 is a plan view partially magnifying a connection device according to a ninth embodiment.

A line arrangement device 142 according to a ninth embodiment is described below. As illustrated in FIG. 12, the line arrangement device 142 according to the ninth embodiment includes a line arrangement sheet 144, instead of the line arrangement box 38 according to the first embodiment. An intermediate portion of a communication optical cable 44 is installed on the line arrangement sheet 144. Similar to the first embodiment, using the communication optical cables 44, rearrangement (line arrangement) is performed between the second optical connectors 28 and the external connectors 40.

The line arrangement device 142 according to the ninth embodiment is used instead of the line arrangement device 16 according to the first embodiment, and for example, the line arrangement sheet 144 is attached to the bottom surface or the side surface of the housing 20 (see FIG. 3). As a result, the intermediate portion of the communication optical cable 44 is installed on the housing 20. At that time, the second optical connector 28 protrudes outwardly from the housing 20 (protrudes to the right in FIG. 12), but the second optical connector 28 may be connected to the first optical connector 26 in the housing 20 (see FIGS. 3 to 10) by curving the communication light cable 44 upward. Thus, in the ninth embodiment, the optical connector pair 24 includes the first optical connector 26 (see FIGS. 3 to 10) and the second optical connector 28.

In the ninth embodiment, the light source 50 and the first optical fiber 46 are provided in the substrate 22. In addition, light from the light source 50 is guided to the first optical connector 26 through the first optical fiber 46. The structure may be achieved, for example, by the structure according to the first embodiment illustrated in FIGS. 3 and 4.

The second optical connectors 28 respectively corresponds to the window member 52 by one-to-one in the line arrangement device 142. The second optical connectors 28 are respectively connected to the window members 52 through the second optical fibers 48. The second optical fiber 48 guides light from a terminal in the second optical connector 28, which is not used to transmit and receive an optical signal to and from the first optical connector 26, to the window member 52.

In the ninth embodiment, when the light source 50 emits light in a state in which the first optical connector 26 and the second optical connector 28 are securely connected to each other, the light passes through from the first optical fiber 46 to the first optical connector 26. In addition, the light reaches the window member 52 through from the second optical connector 28 to the second optical fiber 48. That is, in the ninth embodiment, the connection state between the first optical connector 26 and the second optical connector 28 may be easily checked by visually recognizing the visual check section 54 of the window member 52.

In the above description, the structure in which the plurality of optical connector pairs 24 are provided is described as an example, but for example, the single optical connector pair 24 may be provided. That is, a structure may be employed in which, in the single optical connector pair 24 that includes the first optical connector 26 and the second optical connector 28, light is guided to a terminal of one of the optical connectors by a guide light member, and the light that passes through a terminal of the other optical connector is visually recognized by a visual recognition member. In addition, even when the single optical connector pair 24 is provided, the connection state between the first of the optical connectors and the other optical connector is easily checked by visually recognizing light by the visual recognition member.

The embodiments are described above, but are not limited to the above-described examples, and in addition to the above-described examples, various modifications can be made within a range not departing from the gist, of course.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A connection device comprising:
   an optical connector pair that includes a first optical connector and a second optical connector each of which includes a plurality of terminals and corresponding terminals of which are connected to each other by light;
   a guide light member that guides light to a terminal of the first optical connector; and
   a visual recognition member that is used to visually recognize the light that passes through from the terminal of the first optical connector to a corresponding terminal of the second optical connector.

2. The connection device according to claim 1 further comprising:
   plurality of optical connector pairs and a plurality of guide light members, wherein
   each of the plurality of optical connector pairs includes the first optical connector and the second optical connector, respectively, and each of the plurality of guide light members guides light to the terminal of the first optical connector to the corresponding terminal of the second optical connector in each of the plurality of optical connector pairs.

3. The connection device according to claim 1, wherein
   the guide light member includes a first optical fiber that guides light to the terminal of the first optical connector, from a light source.

4. The connection device according to claim 3, wherein
   the visual recognition member includes a visual recognition window member, and a second optical fiber that guides the light from the corresponding terminal of the second optical connector to the window member.

5. The connection device according to claim 4, further comprising:
   a plurality of optical connector pairs and a plurality of the visual recognition members, wherein
   a number of window members and a number of second optical fibers are identical to a number of optical connector pairs, and
   each of the second optical fibers guides light from the respective corresponding terminal of the second optical connector to the respective window member.

6. The connection device according to claim 1 further comprising:
   a plurality of optical connector pairs each including the first optical connector and the second optical connector, wherein the guide light member forms a light guide that passes through, in order, from the terminal of the first optical connector, to the corresponding terminal of the second optical connector in a certain optical connector pair, to another terminal of another optical connector pair, and the plurality of optical connector pairs are connected to each other in series.

7. A computer system comprising:
   a plurality of computer units each of which includes an arithmetic processing device, and a plurality of first optical connectors to which optical signals from the respective arithmetic processing devices are input;
   a line arrangement device that includes a plurality of second optical connectors that are respectively connected to the plurality of first optical connectors by light, rearranges signal lines from the second optical connectors and performs output of signals;
   a guide light member that guides light to a terminal of a selected one of the first optical connectors or to a terminal of a selected one of the second optical connectors; and
   a visual recognition member that is used to visually recognize the light that passes through from the terminal of the selected one of the first optical connectors to a terminal of another one of the second optical connectors, or from the terminal of the selected one of the second optical connectors to a terminal of another one of the first optical connectors.

8. A connection method of a computer system comprising:
   performing connection of a plurality of computer units each of which includes an arithmetic processing device and a plurality of first optical connectors to which optical signals from the respective arithmetic processing devices are input, through a line arrangement device that includes a plurality of second optical connectors that are respectively connected to the plurality of the first optical connectors by light, rearranges signal lines from the second optical connectors, and performs output of signals;
   guiding light to a terminal of a selected one of the first optical connectors or to a terminal of a selected one of the second optical connectors; and
   visually recognizing the light that passes through from the terminal of the selected one of the first optical connectors to a terminal of another one of the second optical connectors, or from the terminal of the selected one of the second optical connectors to a terminal of another one of the first optical connectors, by a visual recognition member.

* * * * *